United States Patent [19]

Kaul et al.

[11] 4,002,845
[45] Jan. 11, 1977

[54] FRAME SYNCHRONIZER
[75] Inventors: Pradman P. Kaul, Gaithersburg; Pradeep Kaul, Rockville, both of Md.
[73] Assignee: Digital Communications Corporation, Gaithersburg, Md.
[22] Filed: Mar. 26, 1975
[21] Appl. No.: 562,366
[52] U.S. Cl. .......................... 179/15 BS; 178/69.1
[51] Int. Cl.² ...................... H04J 3/06; H04L 7/08
[58] Field of Search ............ 179/15 BS; 178/69.5 R
[56] References Cited
UNITED STATES PATENTS

| | | | |
|---|---|---|---|
| 3,539,997 | 11/1970 | Mahony | 179/15 BS |
| 3,576,947 | 5/1971 | Kruger | 179/15 BS |
| 3,597,539 | 8/1971 | Clark | 178/69.5 R |
| 3,621,140 | 11/1971 | Griffiths | 178/69.5 R |
| 3,842,399 | 10/1974 | Kneuer et al. | 179/15 BS |
| 3,854,011 | 12/1974 | Mallory et al. | 179/15 BS |
| 3,883,729 | 5/1975 | de Cremiers | 179/15 BS |

*Primary Examiner*—Thomas A. Robinson
*Attorney, Agent, or Firm*—Pollock, Vande Sande & Priddy

[57] ABSTRACT

A frame synchronizer is disclosed for searching for the framing bits of an N bit frame in a stream of binary signals. Means are provided to compare, bit by bit, the signals in different bit positions of two adjacent frames. When only a single bit position indicates an alternating pattern of binary signals, it is considered the framing bit and a framing pulse is provided in that bit position. Apparatus is also provided to detect loss of synchronization including a pair of counters, one counting framing pulses and the other counting alternating signals in that bit position. To reduce the likelihood of false out-of-synchronization signals, the second of these counters can be pre-set. Only when the count of the first counter exceeds the number of signals counted by the second counter by this pre-set quantity will out-of-synchronization be declared.

17 Claims, 3 Drawing Figures

FRAME SYNCHRONIZER

FIELD OF THE INVENTION

This invention relates to synchronizing apparatus for digital data transmission systems and particularly to a frame synchronizer and means for detecting loss of synchronism.

BACKGROUND OF THE INVENTION

With the advent of multiplexed digital data communication systems the need for a frame synchronizer became apparent. In order to properly demultiplex the received signal the receiver must be operating synchronously with the transmitter. Thus, the prior art has been concerned with the design and operation of frame synchronizers since at least 1950, see U.S. Pat. No. 2,527,650. That patent relates to a frame synchronizer which is adapted to identify the framing bits in a serial data stream when the framing bits alternate in succeeding frames. That is, if the framing bit in one frame is a 1 the framing bit in the corresponding bit position of the succeeding frame will be a 0. The apparatus in that patent compared the quantity transmitted in a bit position with the quantity transmitted in the corresponding bit position of the next immediately following frame. So long as the quantities alternate in magnitude the bit position was considered a candidate for the framing bit. However, when two frames were detected in which the quantity transmitted in that bit position were the same, the apparatus determined that this bit position was no longer a candidate for the framing bit. In that case, a similar process was performed on an adjacent bit position. In this manner each bit position in the frame was examined until the framing bit position was located.

One drawback to this arrangement was the amount of time consumed in searching for the framing bit position. Andrews Jr., in U.S. Pat. No. 2,949,503, disclosed a frame synchronizer which improved, to some extent, the time consumed in identifyig the framing bit position.

Cirillo and Thovson in an article entitled "Digital Functions" appearing in the Bell System Technical Journal, Vol. 51, No. 8 (October 1972) at pp 1701–1712 disclose a further improvement in frame synchronizing circuits. See especially pp 1705–1708. Instead of examining a single bit position at a time, the Cirillo et al circuit monitors eight bit positions of a frame.

The present invention seeks to further improve the operation of frame synchronizers by reducing the time required for identifying the framing bit.

In addition, the invention also improves the operation of frame synchronizers in that the circuit complexity is reduced.

Furthermore, since the prior art frame synchronizers referred to above, "look" at one, two or a plurality of bit positions (less than all bit positions), simultaneously, some convention must be adopted as to when a particular bit position is considered the framing bit. That is, it is of course possible for data bit positions to alternate in the quantity transmitted, from frame to frame. So long as the data transmitted in any bit position continues to alternate it will "look like" a framing bit. Therefore, for instance, Cirillo et al accept a particular bit position as the framing bit if the alternating pattern persists for about 2.5 milliseconds. Of course, while this may actually be the framing bit, it is also possible for this to be merely a data bit which has alternated in succeeding frames for this predetermined period of time. It is therefore another object of the present invention to select, as the framing bit, only the single bit in the frame which continues to illustrate the alternating pattern while each of the other bits has violated the alternating pattern at least once.

SUMMARY OF THE INVENTION

The present invéntion provides a frame synchronizer which "looks" simultaneously, at all bits of a frame. This is accomplished by delaying the bit pattern by one frame time and comparing corresponding bits in adjacent frames for the alternating pattern indicative of a framing bit. A distinctive signal is provided by the comparing means only if the comparing means has found that the particular bit position shows the alternating pattern. This distinctive signal may be provided to an N bit long shift register (where the number of bits in a frame equal N). This distinctive input is provided to the shift register if, and only if that same bit position has, previously, also exhibited the alternating pattern. The state of the contents of the N bit shift register is continuously monitored and only when the register contains a single distinctive signal does the synchronizer indicate that it has detected the framing bit. Thus, so long as more than one bit position is a possible candidate for the framing bit, the frame synchronizer does not indicate effective synchronization.

In order to monitor the condition of the N bit shift register a counter is operated by the distinctive outputs of the shift register. The counter provides three outputs, one which indicates it is storing a count of one, a second which indicates it is storing a count of two and an indication of a count of zero. The two count output is employed to inhibit further counting of the counter. The counter is reset at a rate equivalent to the frame rate. A memory means monitors the state of the counter which memory means is reset by the two count output of the counter. If, at the conclusion of any frame period the counter has counted up to only one, the memory means is distinctively conditioned to indicate that the possible framing bit positions candidates have been narrowed down to one. At the same time of the next occurrence of that bit position the conjoint action of the memory means output and the N bit shift register output identifies the framing bit position. With that information a counter is reset which thereafter produces framing pulses at the frame rate.

In order to detect loss of synchronism and restore the synchronizing circuit to the search mode, a pair of counters are operated including a frame counter and a correlation counter. The frame counter is operated by the output of the counter producing framing pulses. The correlation counter is operated by signals produced only at the conjunction of the distinctive output from the comparator and the production of a framing pulse. So long as these counters operate at equal rates the synchronizing circuit is assured of proper detection of the framing bit and thus proper demultiplexing. A comparator compares the outputs of the two counters and produces a signal when the frame counter count exceeds that of the correlation counter. If both counters started at the same count, the first transmission error which produced an error in a framing bit would indicate loss of synchronism. Of course, this would not correspond to reality since one or more framing bits may be lost without losing synchronism. Therefore, the correlation counter is preset to a count E higher than the count to which the frame is preset. This offset (identified as E) thus determines the number of framing bits which can be "lost" without the equipment declaring a lost of synchronism. Since the counters are periodically reset to their respective preset quantities, so long as the number of framing bits lost is less than the effect of this offset before the counters are reset, the equipment will not signal a loss of synchronism. If, however, the number of framing bits lost exceeds the effect of the offset before the counters are reset, the equipment will immediately indicate loss of synchronism and reenter the search mode to again identify the framing bit.

BRIEF DESCRIPTION OF THE DRAWINGS

This specification, when taken in conjunction with the drawings attached hereto discloses preferred embodiments of the invention, in the drawings like reference characters identify identical apparatus and.

DETAILED DESCRIPTION OF THE DRAWINGS

Figure 1:
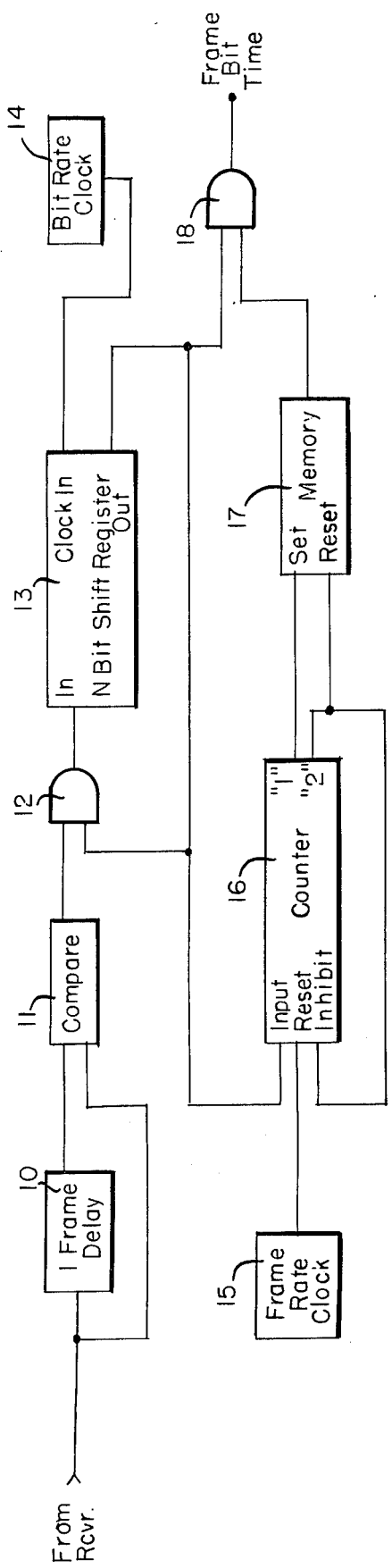
FIG. 1 is a block diagram of an embodiment of our invention for identifying a framing bit position in a data stream.

FIG. 1 is a block diagram of an embodiment of the invention for identifying the framing bit position in a data stream. The data stream, which may typically be serial and be derived from a receiver is provided as an input to a one frame delay unit 10. As is implied, the output of delay unit 10 is a replica of its input delayed by one frame time. The output of delay unit 10 is provided as one input to comparator 11, another input to comparator 11 being provided by the serial data stream. As a result of the delay introduced by the delay unit 10 the inputs to comparator 11 will comprise corresponding bit positions from two adjacent frames. Comparator 11 provides a distinctive output when the inputs to comparator 11 are different. For instance, comparator 11 may well comprise an exclusive OR circuit which is well known to those skilled in the art. The output of comparator 11 is provided to AND gate 12. The output of AND gate 12 is provided as an input to N bit long shift register 13. The output of shift register 13 is provided as the second input to AND gate 12. The contents of the N bit shift register are clocked through the register at the bit rate by bit rate clock 14 which provides the clocking input to the shift register 13. The output of shift register 13 is also provided as one input to a two input AND gate 18, as well as an input to a counter 16. Another input to counter 16 is provided by a frame rate clock 15 which is coupled to the reset input of counter 16. Counter 16 provides at least two outputs, "1" and "2". Output "1" provides a distinctive signal when the counter is storing a count of one therein. Output "2" provides a distinctive signal when the counter 16 is storing a count of two. As is illustrated in FIG. 1 the "2" output is fed back and provided as an inhibit input to counter 16. Therefore, counter 16 may assume one of three states. A reset state or a count of 0, a count of 1, during which time output "1" provides a distinctive output, or a count of two, during which time output "2" produces a distinctive output. Output "1" is coupled to the set input of a memory means "17" and output "2" is coupled to the reset input of memory means 17. The set output of memory 17 is provided as the second input to AND gate 18. AND gate 18 provides a distinctive output at the frame bit time.

Figure 2:
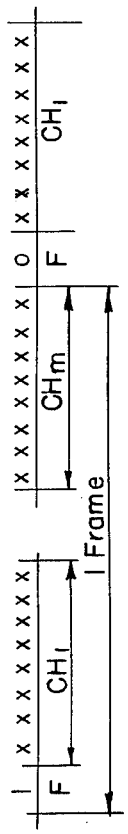
FIG. 2 is a typical representation of a serial data stream identifying the framing bit position.

Prior to describing the operation of the apparatus of FIG. 1 it will be instructive to examine FIG. 2 which illustrates a typical frame and portions of a directly adjacent frame, as a function of time.

Each frame includes N bit positions. One bit position in each frame F is the framing bit which, as is illustrated in FIG. 2, is located at the first bit position in the frame. Those of ordinary skill in the art will understand that the particular bit position in a frame in which the framing bit is located need not be the first bit in the frame, but on the other hand, could be any bit position in the frame. It is only necessary that the remaining portions of the frame be defined with respect to the framing bit position. Thus, as is shown in FIG. 2, the eight bit positions immediately following the framing bit comprise channel 1 of a M channel frame. On the other hand, channel 1 could precede the framing bit position, if desired. Indeed, the framing bit position could be located in the midst of any one of the different channels in the frame. It has become customary in the field for the framing bit position to have an alternating pattern of ones and zeros in succeeding frames so that the framing bit position may be readily identified. Thus, as is shown in FIG. 2 the first frame illustrated includes a 1 in the framing bit position. The initial portion of the succeeding frame which is also illustrated in FIG. 2 includes a 0 in the framing bit position.

Before describing the operation of the apparatus illustrated in FIG. 1 a brief overview will assist the reader in understanding the manner in which each of the different components cooperate to achieve the desired results. The incoming bit stream is applied to a delay unit 10, which delays the bit stream for a full frame period. Thus, comparator 11 compares the corresponding bit positions in two succeeding frames. When the framing bit consists of either a 1 or a 0 in corresponding bit positions of adjacent frames, the comparator 11 may comprise an exclusive OR circuit, for instance. Those of ordinary skill in the art will understand that a different comparator could be employed and will further understand that different types of comparators would, of course, be used if the framing bit was consistent from frame to frame. The output of comparator 11 provides one of the inputs for AND gate 12. In the example under discussion, that is when the framing bit alternates from frame to frame, the comparator 11 will produce a distinctive output when its inputs are different. The other input to AND gate 12 is provided by the output of the N bit shift register 13 which is clocked at the bit rate by clock 14. When the apparatus is in the process of identifying the framing bit the N bit shift register is initially loaded with a string of N distinctive signals which, for example, could be 1's. As a result, for each bit position in one frame which is different from the corresponding bit position in another frame, a 1 will be rewritten into the shift register. However, for every bit position which includes a quantity identical to the quantity in the succeeding frame, a 0 will be written into that bit position in the shift register 13. Thus, as additional frames are received the number of 1's in the shift register 13 continuously decreases as more bit positions are eliminated as possible candidates for the framing bit position.

A counter 16 is reset at the frame rate by clock 15. Counter 16 provides two possible outputs, output "1" when the counter stores a count of one and an output "2" when the counter stores a count of two. As is illustrated in FIG. 1 when the output "2" is high the counter 16 is inhibited from further counting. A memory 17 has its set input connected to output "1" and its reset input connected to output "2". Because the shift register 13 initially stores a string of 1's the counter 16 will tend to rapidly count. However, as soon as it reaches a count of two it will be inhibited until the frame clock 15 resets it. In effect, counter 16 monitors the condition of the contents of the N bit shift register and provides a distinctive output when the N bit shift register contains a single distinctive signal. Under these conditions the memory 17 will be set. Memory 17 may actually comprise a simple flipflop or other bi-stable device.

At some point in time, in the frame succeeding the frame in which memory 17 remains set, and particularly at the time when the single distinctive signal in the register reaches the output of the register, AND gate 18 will be enabled to identify the frame bit time.

Thus, the combination of delay unit 10 and comparator 11 provides a means for comparing every bit position in one frame with a corresponding bit position in another frame and providing a distinctive output when the quantity located in those bit positions is different. Of course, this information is important since it is only those bit positions which are candidates for the framing bit position. This information is loaded into a shift register and a means are provided, including counter 16 and frame rate clock 15 for monitoring the condition of the contents of the shift register and for providing a distinctive output when only a single distinctive signal is contained in the shift register. That means is, of course, the memory 17. The next time that distinctive signal reaches the output of the shift register AND gate identifies the frame bit time.

Figure 3:
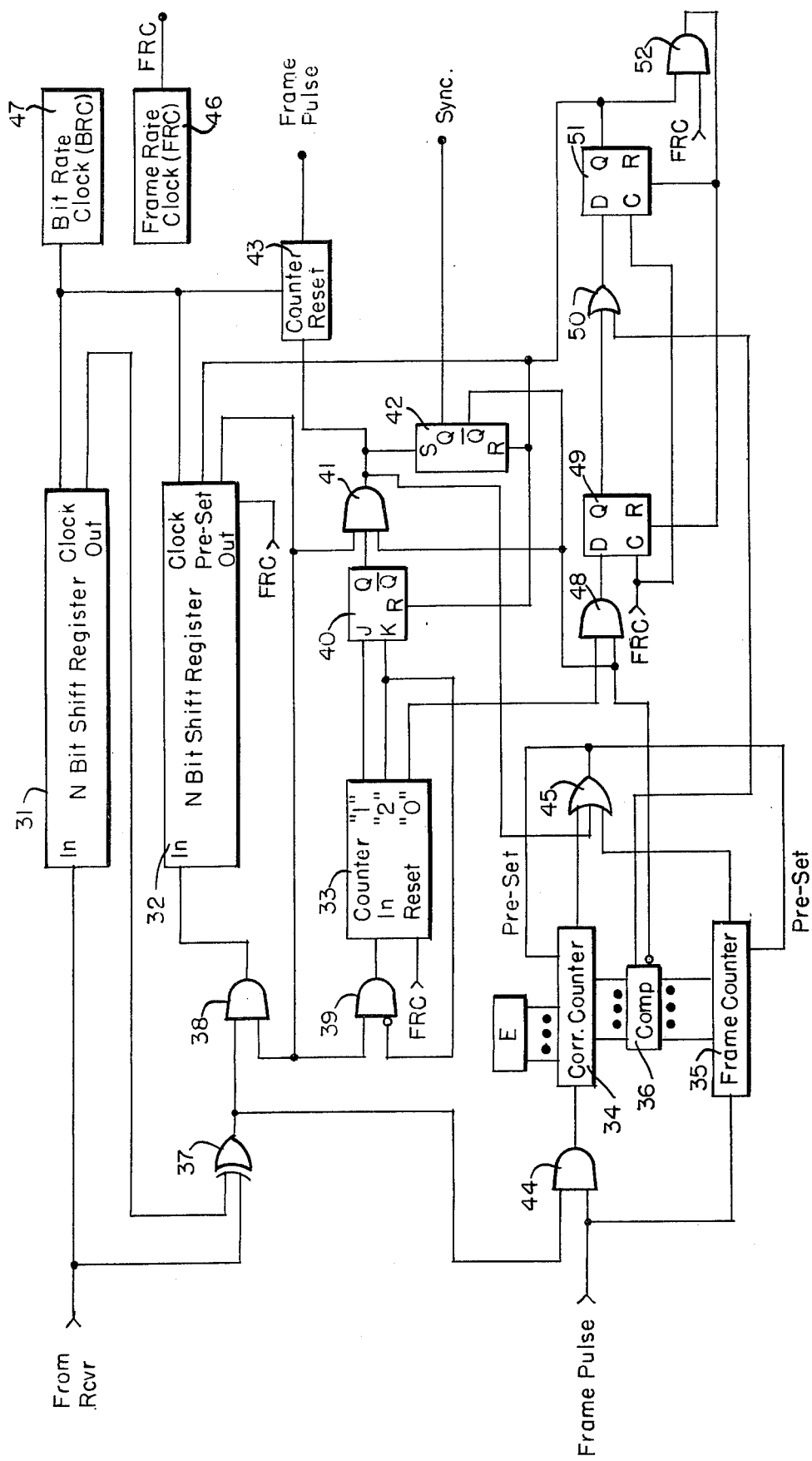
FIG. 3 is a detailed block diagram of another embodiment of the invention which includes apparatus to detect loss of synchronism.

The apparatus of FIG. 3 is another embodiment of the invention in which an "out of sync" detector is included to initialize the frame synchronizer to again search for the framing bit when synchronization is lost. In FIG. 3 the incoming data stream is provided to an N bit shift register 31 which performs the function of the delay unit 10 (illustrated in FIG. 1). This shift register is clocked by the bit rate clock 47 as is the N bit shift register 32 which corresponds to the register 13 (in FIG. 1). The exclusive OR gate 37 performs the comparison function of comparator 11. In FIG. 3 the counter 33 (which corresponds to the counter 16 of FIG. 1) is also operated at the frame rate by clock 46 whose output is identified as FRC for convenience. The output "2", however, is provided as an inhibiting input to AND gate 39 which produces the input signals to counter 33. The memory 17 (in FIG. 1) is illustrated as a flipflop 40 in FIG. 3, with its J input connected to output "1" and its K input connected to output "2". The Q output is provided as one input to AND gate 41, another input to AND gate 41 is provided by the output of shift register 32. AND gate 41 corresponds to AND gate 18 (FIG. 1). In order to produce framing pulses a counter 43 is reset by the output of AND gate 41. The counter 43 is operated at the bit rate and is arranged to produce an output or frame pulse once every N counts.

As thus far described the apparatus of FIG. 3 operates in much the same manner as that of FIG. 1. That is, the incoming data stream is provided to shift register 31 to provide a frame period delay. The delayed data stream is compared with the data stream by exclusive OR gate 37. When the respective bits are unequal a distinctive output is provided to AND gate 38. The other input to AND gate 38 is provided by the shift register 32, which is initially loaded with a series of 1's. Thus, initially, a distinctive output is loaded in the shift register 32 for every distinctive input received by AND gate 38. As more and more bit positions are eliminated as possible candidates for the framing bit, however, AND gate 38 fails to produce a distinctive output. Thus, the number of 1's in the shift register 32 continually decreases. The quantity of 1's in the shift register 32 is monitored by the counter 33 and its condition is reflected in the state of flipflop 40. When flip-flop 40 indicates that only a single 1 is maintained in the shift register 32, AND gate 41 produces a reset pulse for counter 43 at the time that the single 1 reaches the output of the shift register 32. Thus, counter 43 is synchronized to the framing bit and it continually produces framing pulses. The reset input to counter 43 also provides a set input for flipflop 42 whose Q output produces the sync signal indicating the frame synchronizer is now synchronized.

In addition to the foregoing apparatus, the apparatus of FIG. 3 serves to initialize the frame synchronization apparatus and terminate its operation if loss of synchronization is detected. In particular, a flipflop 42 is set by the output of AND gate 41. The Q output of this flipflop provides the sync signal. The $\overline{Q}$ output of this flipflop is provided as an input to an AND gate 48. The other input to AND gate 48 is provided by the "0" output of counter 33. The output of AND gate 48 is provided as the D input of a flipflop 49 whose C input is connected to FRC. The Q output of flipflop 49 is provided as an input to OR gate 50 whose output is provided as the D input to a flipflop 51. The C input of flipflop 51 is also connected to FRC. The Q output of flipflop 51 is the reset signal which serves to initialize the synchronization operation and is connected to the presetting terminal of shift register 32. That same signal serves to reset flipflops 40 and 42 as well as providing an input to an AND gate 52. The other input to AND gate 52 is the FRC signal, and the output of AND gate 52 serves to reset flipflops 49 and 51.

During the frame synchronization operation, that is when data is being inserted into the shift register 31 and, as a result of the comparisons effected by OR gate 37, the number of distinctive signals in the shift register 32 continually decreases, it is possible for the counter 33 to remain in the zero state. Thus, if a framing bit is improperly received during the synchronization operation the bit corresponding to that bit position in the shift register 32 will have its contents set to 0. This is for the reason that improper receipt of a framing bit implies that, as received, the framing bits in two succeeding frames will be identical. Thus, the comparator 37 will not produce the distinctive signal and thus the 1 which had been originally loaded into the shift register 32 will be deleted by AND gate 38. At some point in the cycle, each other bit position will have a 0 inserted therein. As a result, the counter 33 will remain in the 0 state. When this occurs, AND gate 48 detects this condition and sets flipflop 49 at the frame time. Flipflop 51 produces the reset signal in an obvious manner the reset signal has the following effects. Flipflops 40 and 42 are reset to ensure that they are in proper condition for the frame synchronization operation. In addition, the reset signal provides a presetting input to shift register 32. This signal, coupled with the FRC signal allows a 1 to be written into each bit position in the shift register. At the same time, new data is being written into the shift register 31. At the conclusion of a frame period, operation of the synchronization apparatus begins again as has been previously explained. At the same time time, however, the reset signal is received by AND gate 52 resetting flipflops 49 and 51.

When synchronization is achieved flipflop 42 becomes set providing the sync signal. The $\overline{Q}$ output of flipflop 42 goes low (as the flipflop is set) and a number of effects occur. AND gates 41 and 48 are disabled. As a result, the counter 43 which produces the frame pulse will, after being reset, produce a single frame pulse for each frame corresponding to the bit position at which time it was reset. In other words, counter 33 and flipflop 40 no longer control the state of counter 43. Furthermore, the output of the counter 33 will have no effect on flipflops 49 and 51 and thus the reset signal will not be produced as a result of the output of counter 33. However, if the out of synchronization detector, to be discussed hereinafter, indicates loss of synchronization a signal will be provided to the other input of OR gate 50 to thereby produce the reset signal and begin the same cycle of operation as before.

Prior to describing the apparatus and operation of the out of sync detector it should be mentioned that the out of sync detector should not indicate loss of synchronization merely because a single framing pulse is not received. Thus, transmission errors and the like may cause the receiver not to receive an isolated framing pulse. The inherent stability of the receiver, however, will not cause this to result in loss of synchronization. However, a commulative series of failures to receive the framing pulse may well result in loss of synchronization. Therefore, the out of sync detector is arranged to respond to this cummulative loss of framing pulses. Furthermore, the number of cummulative loss of framing pulses that cause an out of sync condition is variable to provide flexibility for different communication systems.

The out of sync detector includes a pair of counters, a correlation counter 34 and a frame counter 35. Frame counter 35 counts framing pulses, i.e., the pulses produced by counter 43. Correlation counter 34 counts signals provided by AND gate 44. AND gate 44 is a two input AND gate, one of whose inputs is the frame pulse, from counter 43. The other input to AND gate 44 is the output of exclusive OR gate 37. Thus, AND gate 44 produces an output for every frame pulse which occurs when exclusive OR gate 37 indicates a dissimilarity from that bit position and the corresponding bit position in a previous frame. So long as framing pulses are actually received counter 34 and counter 35 count at identical rates. However, for every framing pulse which is omitted, counter 34 drops back one count from frame counter 35. The outputs of correlation counter 34 and frame counter 35 are provided as inputs to a comparator 36. Whenever the output of frame counter 35 exceeds the output of correlation counter 34 comparator 36 produces a signal to OR gate 50. This signal also produces RESET, as explained above which resets flipflops 40 and 42. At flipflop 40 the resetting action prevents synchronization from being signaled until only a single 1 is again resident in the shift register 32. The RESET signal also causes both shift registers 31 and 32 to be initialized as previously explained.

The terminal count output of each of counters 34 and 35 provide inputs to an OR gate 45. The output from OR gate 45 causes both correlation counter 34 and frame counter 35 to be preset. Likewise, the output of AND gate 41 causes both counters 34 and 35 to be preset through OR gate 45. Thus the counters are preset each time either one reaches its terminal count or each time the synchronization circuit identifies the framing bit.

If both counters 34 and 35 are preset to identical quantities, for instance to 0, then, as soon as frame counter 35 has advanced a single count higher than correlation counter 34 the out of synchronization signal will be produced with the above described effects. However, from the foregoing it is clear that it is not desirable for out of synchronization to be declared after only a single framing pulse has been dropped. To that end, therefore, correlation counter 34 can be preset to a number E greater than frame counter 35. Thus, so long as the number of framing pulses which are lost is less than effect of the offset E in a period of time before either counter reaches its terminal count, out of synchronization will not be declared.

From the foregoing it should be clear that simply by varying E, the offset between the correlation counter 34 and frame counter 35, the number of framing bits which can be erroneously received before declaring out of synchronization, can be controlled. Actually, the number E is only half the allowable errors. This is true since each framing bit error will cause the correlation counter 34 to drop back two counts from the frame counter 35. It will drop back once when the framing bit in error is compared with the previous bit. The correlation counter 34 will drop back a second count when the framing bit in error is itself the previous framing bit which is compared with the present framing bit.

This particular out of synchronization detector has a number of significant advantages. In particular, the number E, the offset between the correlation counter 34 and frame counter 35, can be varied at will merely by controlling the number to which the correlation counter 34 is preset. In addition, as soon as the number of errors exceeds the effect of the offset E, out of synchronization will be declared; without having to wait for either counter to reach its terminal count, thereby eliminating additional delay to declare loss of frame and starting re-acquisition.

When out of synchronization is declared the RESET signal is produced, with the above described effects. One of these effects is to reset flipflop 42. The $\overline{Q}$ output of flipflop 42 will inhibit bit output of comparator 36 until the frame synchronizer has achieved synchronization. During the period when frame synchronizer is searching for the framing bit there is no purpose for output signals from comparator 36.

Those of ordinary skill in the art will understand that a variety of changes can be effected to the apparatus shown in FIGS. 1 and 3 without departing from the scope of the invention. For instance, the bit rate clock and frame rate clock 47 and 46 may actually comprise a counter with a divided output at the frame rate. In addition, bi-stable circuits other than flipflops may be employed in lieu of flipflops 40 and 42.

In addition those of ordinary skill in the art will understand that the shift register 32 or 13 comprises a dynamic memory. Those persons skilled in the art will understand that it is not necessary to employ a dynamic memory but, instead, a static memory could be employed with a number of storage positions contained therein equal to the number of different bit positions in a frame. With such modification the apparatus would operate much in the same manner except that the frame and bit rate clock outputs would have to be decoded to provide accessing signals for the static storage device. Instead of a counter monitoring the number of distinctive quantities stored in the storage means, an accumulator can be arranged to sum the quantity stored in the static storage device. When that sum equals one, of course, the search is concluded and the position in which the one is stored would indicate the position of the framing bit in the frame.

What is claimed is:

1. A frame synchronizer for searching for framing bits of an N bit frame in a stream of binary signals occurring at a bit rate and wherein said frames repeat at a rate equal to said bit rate divided by N, comprising;
   first means for comparing each bit of said stream with the corresponding bit in a previous frame and for producing a distinctive signal if said bits are different,
   an N bit shift register clocked at said bit rate and providing an output,
   second means providing a distinctive input to said register if and only if, said first means produces said distinctive signal contemporaneous with a distinctive output of said shift register,
   counting means connected to the output of said shift register for counting distinctive outputs of said shift register,
   memory means operated by said counting means to a pre-determined condition if, and only if, said counting means counts a single distinctive output in a period corresponding to a single frame,
   third means for identifying said framing bit and producing an output if, and only if, said shift register produces a distinctive output when said memory means is in said pre-determined condition,
   timing means for producing frame pulses at said framing rate, said timing means being connected to and reset by said third means output, and,
   an out-of-sync detector including a second and third counting means, said second counting means connected to and counting the output of said timing means,
   said third counting means counting contemporaneous outputs of said timing means and said first means, and
   comparator means connected to outputs of said second and third counting means for producing an out-of-sync signal when the output of said second counting means exceeds the output of said third counting means.

2. The apparatus of claim 1 which further includes a means for resetting said second and third counting means, said means resetting said third counting means to a value E greater than the quantity to which said second counting means is reset.

3. The apparatus of claim 2 in which said resetting means operates in response to either said second or third counting means reaching its respective terminal count.

4. The apparatus of claim 3 which includes means for presetting said shift register with a distinctive signal in each bit position thereof in response to said out of sync signal.

5. A frame synchronizer for searching for framing bits on an N bit frame in a stream of binary signals occurring at a bit rate, and wherein said frames repeat at a rate equal to said bit rate divided by N, comprising;
   first means for comparing each bit of said stream with a corresponding bit in a previous frame and producing a distinctive signal if said bits are different,
   an N bit shift register clocked at said bit rate and providing an output,
   second means providing a distinctive input to said register, if and only if, said first means produces said distinctive signal contemporaneous with a distinctive output of said shift register,
   counting means connected to the output of said shift register for counting distinctive outputs of said shift register,
   memory means operated by said counting means to a predetermined condition, if, and only if, said counting means counts a single distinctive output in a period corresponding to a single frame,
   third means for identifying said framing bit and producing an output, if and only if, said shift register produces a distinctive output when said memory means is in said predetermined condition,
   wherein said means for comparing includes a second shift register having an input connected to receive said data stream and an output, and a comparing unit connected to said input and output of said second shift register producing a distinctive signal, if, and only if, said comparing unit inputs are different.

6. The apparatus of claim 5 in which said comparing unit includes an exclusive OR gate.

7. The apparatus of claim 6 in which said counting means includes a counter connected to the output of said shift register, clock means operating at said frame rate and connecting to said counting means for inhibiting operation of said counter responsive to said counter reaching a count of two.

8. The apparatus of claim 7 in which said memory means includes a bi-stable circuit means connected to said counter and operated to said predetermined condition when said counter contains a single count and operated to another condition when said counter contains a count other than one.

9. The apparatus of claim 8 in which said bi-stable circuit means includes a flipflop connected to said counter.

10. The apparatus of claim 9 in which said third means includes an AND gate with one input connected to the said output of said flipflop and another input connected to the output of said shift register.

11. A frame synchronizer for searching for a framing bit position in a data stream which includes a plurality of N bit frames, including;
   first means for serially comparing each received bit with a corresponding bit of an immediately preceding frame and for producing a distinctive output if said bits indicate that the position in which they appear could be the framing bit position,
   storage means having a storage position for each bit position of said frame, each said storage position capable of storing a distinctive quantity indicating said corresponding bit position is a candidate for the framing bit position or storing another quantity indicating that the corresponding bit position is not a candidate for said framing bit position, means for storing said distinctive output in a storage position corresponding to said bit position only if the quantity previously stored therein was said distinctive quantity, means for storing a distinctive quantity in each storage position of said storage means on the initiation of a search, and means for monitoring the number of distinctive quantities stored in said storage means and for identifying said framing bit position when only a single distinctive quantity is stored in said storage means, including counting means capable of counting to a count of 2 and reset at a frame rate, and memory means operated to a distinctive condition on simultaneous detection of a distinctive output of said storage means when said counting means indicates a single count.

12. The apparatus of claim 11 in which said first means includes a delay means for delaying said data stream by one frame time and an exclusive OR gate with an input connected to receive said serial data stream and another input connected to the output of said delay unit.

13. The apparatus of claim 12 wherein said delay means comprises a second shift register.

14. The apparatus of claim 13 in which said means for storing comprises an AND gate having an input connected to the output of said exclusive OR gate and a second input connected to the output of said shift register.

15. Apparatus for use with a frame synchronizer for flexibly detecting loss of synchronization with a minimum delay which is not adversely affected by error bits comprising, first means responsive to a received bit stream for detecting conditions indicative of a frame bit, and producing a first signal responsive thereto, second means responsive to each frame pulse produced by synchronizing apparatus indicative of the expected position of a frame bit and for producing a second signal corresponding thereto, comparing means responsive to both said first and second signals for indicating loss of synchronization when the accummulated count of said second signals exceeds the accummulated count of said first signals, wherein the improvement comprises adjustable means for presetting said comparing means to provide an initial offset between said first and second signals whereby only when said accumulated count of said second signals exceeds the accummulated count of said first signals by said offset, will loss of synchronization be indicated.

16. The apparatus of claim 15 wherein said comparing means includes a pair of counters, each responsive to one of said first and second signals, and wherein there is further provided presetting means for presetting the counter responsive to said first signals when either of said first or second counters reaches a terminal count.

17. The apparatus of claim 16 wherein said presetting means is adjustable to vary the number to which one of said counters is preset.

* * * * *